INVENTORS.
NORTON W. BELL
JOHN F. KINKEL
BY
Christie, Parker & Hale
ATTORNEYS

United States Patent Office 2,909,622
Patented Oct. 20, 1959

2,909,622

DIRECT CURRENT DIFFERENTIAL AMPLIFYING SYSTEM

Norton W. Bell, Monrovia, and John F. Kinkel, Altadena, Calif., assignors to Consolidated Electrodynamics Corporation, Pasadena, Calif., a corporation of California Application August 20, 1956, Serial No. 605,155

8 Claims. (Cl. 179—171)

This invention relates to arrangements for attenuating signals in direct current differential amplifier systems resulting from the "common mode" input signals.

A differential direct current amplifier is ordinarily provided with a balanced input circuit with the input terminals being at a potential which is different from ground. The potential which is common to the two input terminals is referred to as the "common mode" voltage, and the potential of the two input terminals with respect to one another is referred to as the "normal mode" voltage. The normal mode signal is amplified by the amplifier, and it is desirable to minimize the effect of the common mode voltage on the output which is produced by the amplifier.

For example, a bridge circuit with a battery connected across two diagonally spaced junctions results in a voltage at each of the other junctions having some value with respect to ground. An unbalancing of the bridge causes one junction to rise above the value and the other junction to fall below the value. To determine the difference between the unbalanced signals, the signals are applied to a differential amplifier.

The voltage at each junction may be considered as consisting of a common voltage and a varying voltage. The varying voltage varies above or below the common voltage. The junctions are coupled to grids of electronic tubes. If the electronic tube characteristics are identical, the output signal is proportional to the difference between the varying voltage components of the input voltages. Unfortunately, the characteristics of most electronic tubes are not identical. An output signal is usually obtained which contains not only the signal proportional to the differences in the varying component of the input voltages, but also an output signal component resulting from the voltage common to the two input voltages. This common voltage is often referred to as a "common mode" signal.

The problem of unwanted output signals having components which result from the common mode of the input voltages is solved by our invention. A means is provided for stabilizing the anode-to-cathode voltage of the tubes in the first few stages against changes caused by the common mode voltages. The anode voltage of the amplifier tubes is varied by an amount equal to the common mode input so that the anode-to-cathode voltage is stabilized.

Usually a high gain differential amplifier system consists of many stages. Our new common-mode voltage rejection means is included in the first few stages only. After the voltage have been amplified a few times, the voltage resulting from the normal mode input voltage will far exceed any voltage resulting from the common-mode input voltage. Hence, common-mode rejection means is unnecessary in the later stages of amplification.

By the term "normal mode" we mean the voltage variation components of the input voltage. Hence, the normal mode voltage is distinguished from the "common-mode" voltage which is the common voltage component of the input voltages. The "normal mode" may also be considered the out-of-phase component; the "common mode" signal, the in-phase component.

A better understanding of the present invention and its advantages may be had upon a reading of the following detailed description when taken in connection with the drawings, in which.

Figure 1:
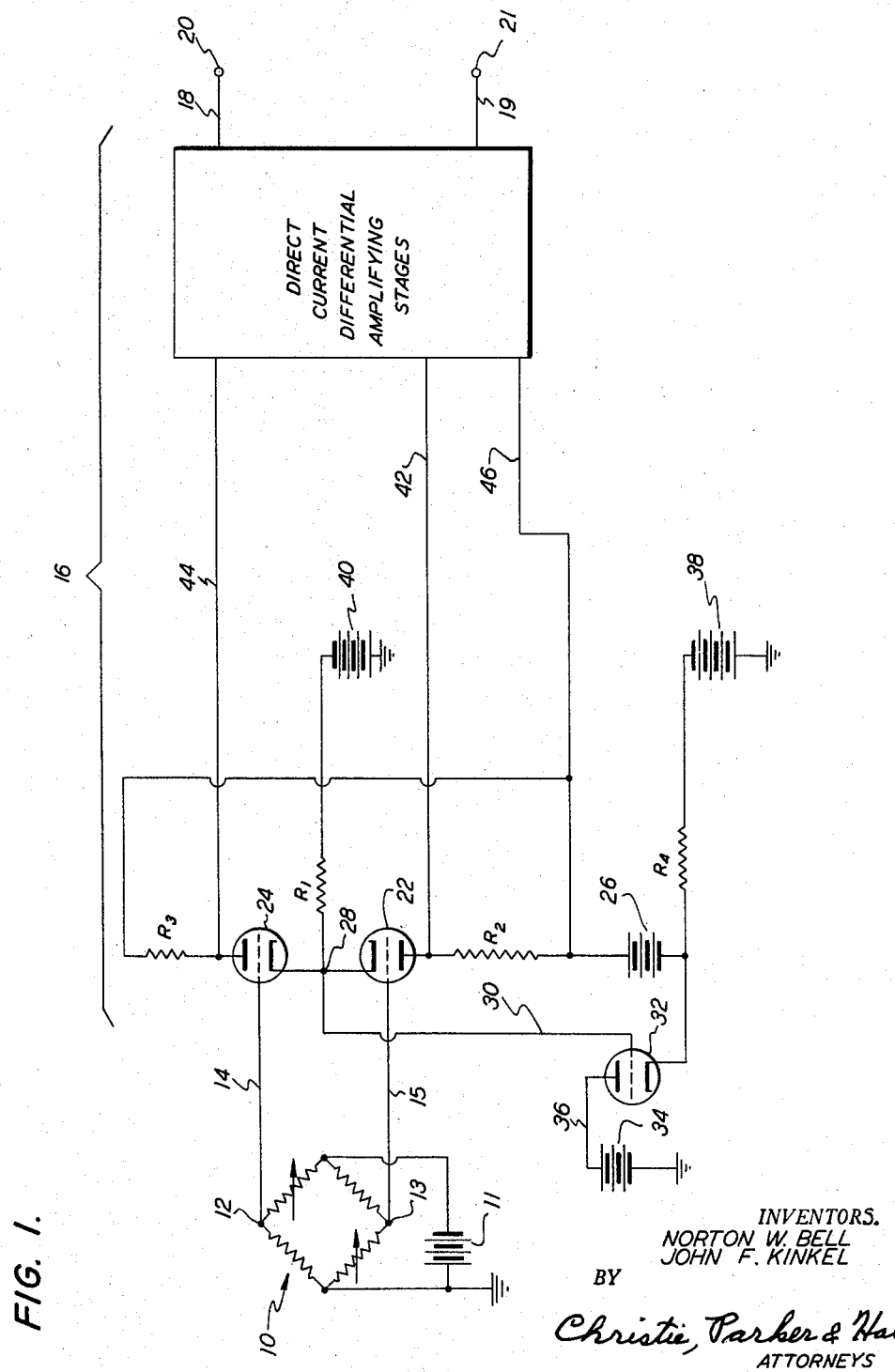
Fig. 1 is a schematic and block diagram showing an arrangement for attenuating signals resulting from the common mode signals.

Referring to Fig. 1, a source 10 emits small signal variations which are to be amplified. By way of example, this source may be a strain gauge bridge circuit having a battery voltage supply 11. Four resistance arms are included as part of the bridge circuit. Two of the arms are variable in response to strains (as indicated by the arrows).

If a ten volt battery is used as the voltage source 11, the voltages at each of junctions 12 and 13 with respect to ground may consist of a five volt component and a voltage component caused by strains which varies above and below the five volts. The five volt component is termed the common mode voltage and the varying voltage is called the normal mode voltage. The common mode components are in-phase and the normal mode components are out-of-phase.

The signals from junctions 12 and 13 are conducted through leads 14 and 15 to a direct current differential amplifier 16 having several stages. The signals are amplified by the amplifier and the output signals are conducted through leads 18 and 19 to output terminals 20 and 21.

A balanced direct current differential amplifier produces an output which is linearly related to the difference in the input signals. In a balanced system the changes in signal input to one grid of an electronic tube causes a change of opposite sign in the grid of a second tube. If the anode-to-cathode voltage-current characteristics of the two tubes are not identical, an undesirable voltage component appears in the output. This undesired voltage component results from the common-mode input voltage component.

We propose to stabilize the anode-to-cathode voltages of some of the stages in a direct current differential amplifying system against changes resulting from the common mode component. The undesired output voltage component is generally in-phase with the common-mode input voltage component and the desired output voltage resulting from the normal mode input voltage component is generally out-of-phase with the normal mode components. If some of the stages are stabilized by feeding to the anode of the tubes a voltage equal to the common-mode voltage, the effect of the common-mode voltage is compensated for. The normal mode output, however, is amplified at each stage. For example, if the first few stages of the direct current differential amplifier 16 are stabilized, after the signal passes through a few stages the amplitude of the normal mode signal output is much greater than the amplitude of the common-mode signal output. Therefore, it is necessary that our compensation system be included only in the first few stages of amplifier 16.

In Fig. 1 one common mode output signal attenuation stage only is shown for purposes of simplicity. It is understood that similar stages may be included. Unilateral conducting devices such as electronic tubes 22 and 24 have a common cathode resistance $R_1$ connected to the negative terminal of a battery 40. Resistance $R_1$ has a resistance of about 800,000 ohms. A battery 26 is provided for the purpose of supplying the plates of tubes 22 and 24 with a plate voltage through plate resistors $R_2$ and $R_3$, respectively. As shown the resistors $R_2$ and $R_3$ are connected between a common terminal point (which is connected to the positive terminal of the battery 26) and the plates of the tubes 22 and 24 respectively. The plates of the other stages may be supplied with voltage from battery 26 through lead 46.

Connected to the common cathode at junction point 28 is a lead 30 to the grid of an electronic tube 32 which is a variable and controllable impedance device. Electronic tube 32 has its cathode connected to the negative terminal of battery 26 and the negative terminal of a battery 38 through resistance $R_4$. The plate of tube 32 is coupled to the positive terminal of a battery 34 through lead 36.

When the signals are fed through leads 14 and 15 to the grids of tubes 22 and 24, respectively, the normal mode component of each signal is amplified and fed through leads 42 and 44 to the following stages. The effect of the common-mode component, however, is attenuated.

Changes in grid-to-cathode voltages of tubes 22 and 24, due to the varying signal or normal mode component of the input signals, cancel out in the cathode resistance $R_1$. This is so because the signal variations of normal mode signals are out-of-phase with each other. Hence, no correction of anode-to-cathode voltage is caused by the normal mode components of the input signals.

However, changes in the grid-to-cathode voltages of tubes 22 and 24, due to the common-mode signals, result in a change in potential at the grid of electronic tube 32 because the effect of this signal is additive in resistance $R_1$. If the grid-to-cathode voltage of the tube 32 tends to increase due to an increase in common-mode voltage, more current flows through tube 32 and lead 36 and the voltage across $R_4$ increases, thereby increasing the anode-to-cathode potential of the tubes 22 and 24. Conversely, a decrease in common-mode input voltage causes a decrease in the anode-to-cathode potential of the tubes 22 and 24. The anode-to-cathode voltages of tubes 22 and 24 are thus stabilized and the effect of the common-mode voltage minimized.

Figure 2:
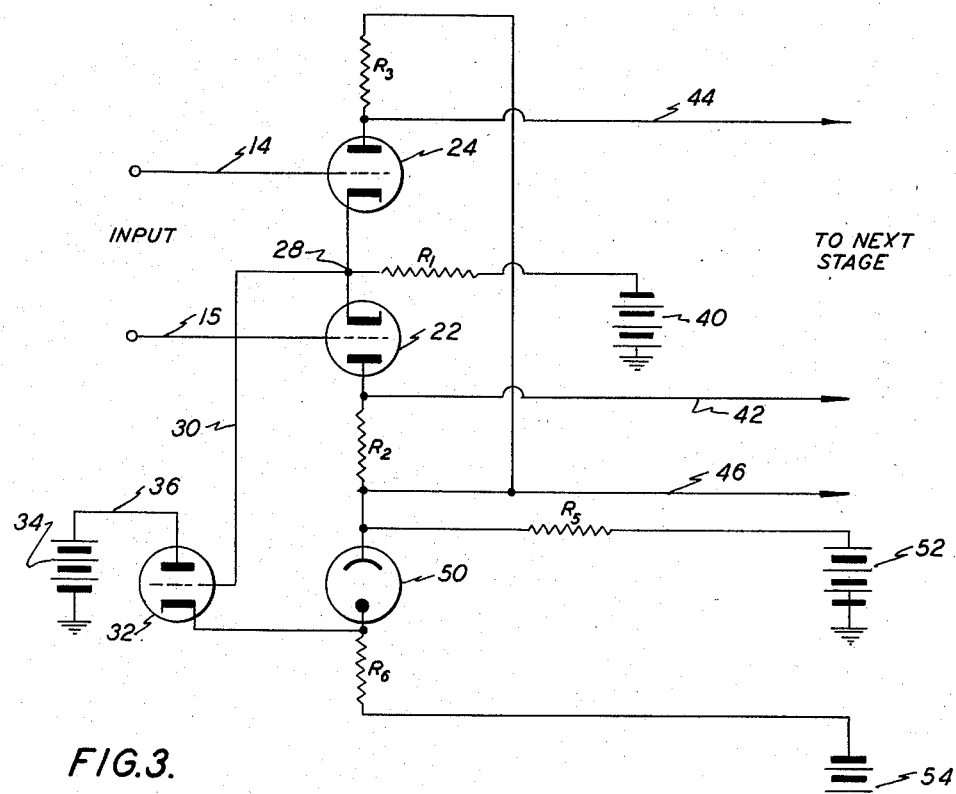
Fig. 2 is a schematic diagram showing a second embodiment of a common mode signal attenuator.

Another embodiment which may be used to compensate for the undesired common-mode components is shown in Fig. 2. Substituted for the voltage source 26 is a voltage regulator tube 50 having its plate coupled to the positive terminal of a battery 52 through resistance $R_5$ and its cathode coupled to the negative terminal of a battery 54 through resistance $R_6$.

As is well known in the art, the voltage regulator tube maintains a constant voltage regardless of the current flowing therethrough. The dynamic resistance of a voltage regulator tube is low. If the common-mode component tends to increase, the voltage across each of the tubes 22 and 24 tends to decrease. However, the bias applied to the grid of tube 32 is decreased, causing more current to flow through tube 32. Therefore, more current flows through resistance $R_6$ increasing the voltage across it. Since the voltage across voltage regulator tube 50 in unchanged, a voltage is added to tubes 22 and 24. Conversely, a tendency of the common-mode component to decrease results in less current flow through resistance $R_6$, a decrease in voltage across it, and a decrease in the voltage fed to tubes 22 and 24. The anode-to-cathode voltages are thus stabilized.

Figure 3:
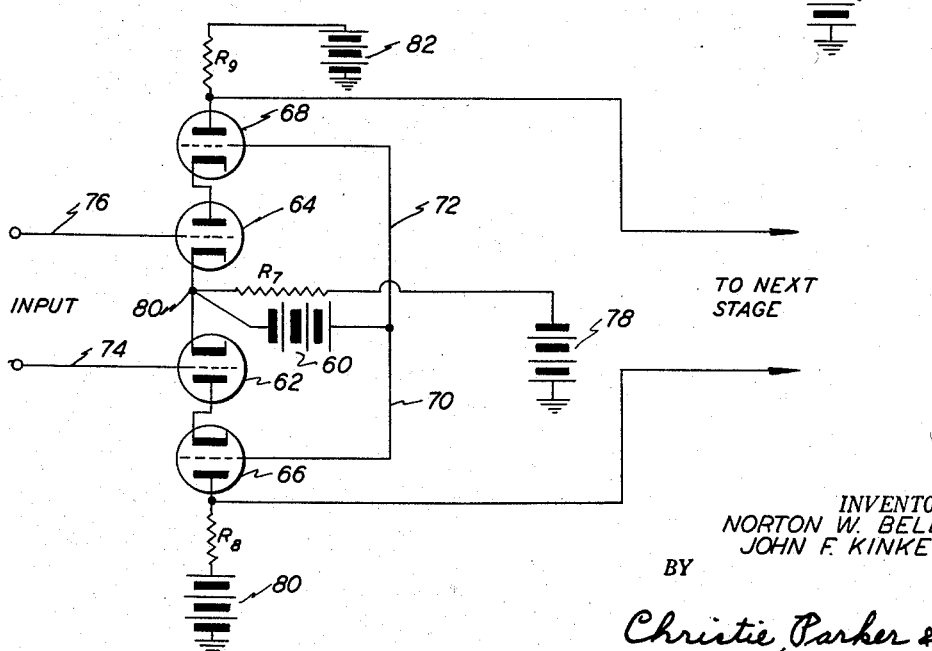
Fig. 3 is a schematic showing another embodiment of our invention for attenuating the effects of the common mode signal input.

A third system for stabilizing the anode-to-cathode voltages is shown in Fig. 3. The negative terminal of a battery 60 is connected to the common cathodes of electronic tubes 62 and 64. Battery 60 is also connected to the grids of electronic tubes 66 and 68 by leads 70 and 72, respectively. Input voltages are fed to the grids of tubes 62 and 64 by leads 74 and 76, respectively. The outputs are taken from the plates of tubes 66 and 68. The cathodes are coupled to the negative terminal of a battery 78 through resistance $R_7$. Plate voltages are supplied by battery 80 and battery 82, through resistances $R_8$ and $R_9$.

The cathode of tube 66 is connected to the plate of tube 62; the cathode of tube 68 is connected to the plate of tube 64.

The common-mode components of the input signals are compensated for by means of the battery 60. If the common-mode component of the input signals is increased, the plate-to-cathode voltage of tubes 62 and 64 tends to decrease. Since the plates of tubes 62 and 64 are coupled to the cathodes of tubes 66 and 68, respectively, these cathodes also tend to decrease in voltage. More current will then flow through all of the tubes. However, the voltage at point 80 is increased. Hence, the voltage at the grids of tubes 66 and 68 is increased, causing the plates of tubes 62 and 64 to increase in voltage. If the common-mode signal is decreased, the voltage at point 80 decreases and the plate voltages of tubes 62 and 64 are decreased. The plate-to-cathode voltages of tubes 62 and 64 are thus stabilized. The stabilization of tubes 62 and 64 results in a relaxation of the "tracking" requirements of the plate resistances of tubes 66 and 68 with changes in plate potential.

The following values have been used in the circuits shown in Figs. 1, 2 and 3:

Batteries 34, 38, 40, 52, 54, 78, 80 and 82 _____volts__ 250
$R_1$ and $R_7$ _____ohms__ 800,000
$R_2$, $R_3$, $R_8$, and $R_9$ _____do____ 40,000
$R_4$ and $R_6$ _____do____ 10,000
$R_5$ _____do____ 35,000

Notice that in each of the circuits shown in Figs. 1 and 2 the effect of the normal mode components of the input signals cancel out in $R_1$ and in $R_7$ in Fig. 3. Thus, even though the anode-to-cathode voltages are stabilized against changes caused by the common-mode component of the input signal to attenuate its effect on the output, the anode-to-cathode voltages are permitted to change in response to the normal mode components of the input signals.

Thus, we have provided a solution to the problem of an undesired output signal component resulting from the common mode input signal inherent in the use of high gain differential amplifiers in amplifying small signals. These circuits are simple in construction and yet very effective in eliminating the undesired signals.

We claim:

1. A direct current differential amplifier including first and second electronic tubes, each of the tubes having an anode, a grid and a cathode, an input terminal coupled to the grid of each of the tubes, an output terminal coupled to the anode of each of the tubes, a voltage source, first and second impedance means, each of the impedance means including first and second terminals, the first terminal of the first and second impedance means being connected to the anodes of the first and second tubes respectively, a resistor having first and second terminals, the first terminal of the resistor being connected to the cathodes of each of the tubes, a variable and controllable impedance device, means for connecting the impedance device and the voltage source in series relationship between the second terminal of the resistor and the second terminals of the first and second impedance means, and means coupling the impedance device to the cathodes of the first and second tubes to cause the impedance of the variable impedance device to vary and the voltage applied across the anodes and cathodes of the electronic tubes to vary in accordance with the potential at the cathodes of the tubes.

2. A direct current differential amplifier including first and second electronic tubes, each of the first and second tubes having an anode, a grid and a cathode, an input terminal coupled to the grid of each of the first and second tubes, an output terminal coupled to the anode of each of the first and second tubes, a common cathode resistor having first and second terminals, the first terminal of the cathode resistor being connected to the cathode of each of the first and second tubes, first and second plate resistors, each of the plate resistors having first and second terminals, the first terminal of the first and second plate resistors being connected to the anodes of the first and second tubes, respectively, at least a first voltage source coupled between the second terminal of the cathode resistor and the second terminal of the first and second plate resistors and means coupled to the voltage source and to the cathodes of the first and second tubes and responsive to common-mode components of signals applied across the input terminals to control the potential between the plate and cathodes of the first and second tubes to minimize the effects in signals established across the output terminals due to common-mode components of signals applied across the input terminals.

3. A direct current differential amplifier as defined in claim 2 wherein the last named means includes a third electronic tube having an anode, a grid and a cathode, and a second voltage source, the cathode of the third tube being connected to the first voltage source, the grid of the third tube being connected to the cathodes of the first and second tubes, the second voltage source being coupled to the anode of the third tube.

4. A direct current differential amplifier as defined in claim 3 wherein the last named means includes a third electronic tube having an anode, a grid and a cathode, a voltage regulator tube having an anode and a cathode, and a second voltage source, the grid of the third tube being coupled to the cathodes of the first and second tubes, the voltage regulator tube being connected between the first voltage source and the cathode of the third electronic tube, the second voltage source being coupled to the anode of the third tube.

5. In a direct current differential amplifier, the combination which comprises first, second and third electronic tubes, each of the tubes having a plate, a cathode and a grid, a common cathode resistor having first and second terminals, the first terminal of the cathode resistor being connected to the cathode of the first and second tubes, means for applying a biasing potential to the second terminal of the cathode resistor, a common terminal point, a plate load resistor connected individually between the common terminal point and the plates of the first and second tubes, means for applying a biasing potential to the common terminal point, a voltage regulator having an anode and a cathode for establishing a substantially constant voltage across the anode and cathode thereof, the anode of the voltage regulator being connected to the common terminal point, a fourth resistor connected to the cathode of the voltage regulator, means for applying a biasing potential to the fourth resistor, the cathode of the third tube being connected to the cathode of the voltage regulator, the grid of the third tube being connected to the cathodes of the first and second tubes, and means for applying a biasing potential to the plate of the third tube, whereby the voltage between the common terminal point and the second terminal of the cathode resistor is controlled in accordance with the potential at the cathodes of the first and second tubes.

6. In a direct current differential amplifier the combination which comprises first, second and third electronic tubes, each of the tubes having a plate, a cathode and a grid, a cathode resistor having first and second terminals, the first terminal of the cathode resistor being connected to the cathodes of the first and second tubes, means for applying a biasing potential to the second terminal of the cathode resistor, a common terminal point, a plate load resistor connected individually between the common terminal point and the plates of the first and second tubes, a voltage source having first and second terminals, the first terminal of the voltage source being connected to the common terminal point, a fourth resistor having first and second terminals, the first terminal of the fourth resistor being connected to the second terminal of the voltage source, means for applying a biasing potential to the second terminal of the fourth resistor, the cathode of the third tube being connected to the second terminal of the voltage source, the grid of the second tube being connected to the cathodes of the first and second tubes and means for applying a biasing potential to the plate of the third tube whereby the voltage applied across the plates and cathodes of the first and second tubes will vary in accordance with the potential at the cathodes of the first and second tubes.

7. A direct current differential amplifier system including first, second and third unilateral conducting devices, each of the devices having an input and an output circuit, means including a load impedance individually coupled in the output circuits of each of the first and second devices for applying an energizing potential across the output circuits of the devices, a resistor connected in series with the output circuits of each of the first and second devices so that any common-mode signals applied to the input circuits of the devices will cause a change of potential across the resistor, the input circuit of the third device being coupled to the resistor to apply a potential across the input circuit of the third device that is proportional to the potential across the resistor, the output circuit of the third device being coupled to the means for supplying an energizing potential to the first and second devices to vary the energizing potential applied across the output circuits of the first and second devices in accordance with the potential established across the resistor to thereby minimize the effects in the signals developed in the output circuits of the first and second devices due to common-mode components of signals applied across the input circuits of the first and second devices.

8. A direct current differential amplifier system as defined in claim 7 wherein each of the unilateral conducting devices is an electronic tube having a plate, a cathode and a grid.

References Cited in the file of this patent
UNITED STATES PATENTS

| | | |
|---|---|---|
| 2,677,729 | Mayne | May 4, 1954 |
| 2,731,519 | Bordewieck | Jan. 17, 1956 |
| 2,780,682 | Klein | Feb. 5, 1957 |